March 19, 1946.   P. WALDVOGEL   2,396,764
VOLTAGE MEASURING DEVICE FOR POWER TRANSFORMERS
Filed June 17, 1941   2 Sheets-Sheet 1

Inventor:
Paul Waldvogel,
By Pierce & Scheffler,
Attorneys.

Patented Mar. 19, 1946

2,396,764

UNITED STATES PATENT OFFICE 2,396,764

VOLTAGE MEASURING DEVICE FOR POWER TRANSFORMERS

Paul Waldvogel, Baden, Switzerland, assignor to Actiengesellschaft Brown, Boveri & Cie, Baden, Switzerland Application June 17, 1941, Serial No. 398,506
In Switzerland June 29, 1940

3 Claims. (Cl. 171—95)

In a substation having one or more power transformers the voltage is generally measured at the bus-bars or the terminals of the power transformer by means of a voltage transformer which steps down the high voltage to a voltage value which can be measured. These transformers are, however, very expensive when ultra high voltages have to be transformed and they also occupy a considerable amount of space thus considerably increasing the size of the entire plant.

The object of the present invention is to construct a simple and cheap measuring device which as an accessory to the power transformer is built into the latter and gives a very exact image of the terminal voltage which is to be measured. The fundamental idea on which the construction of such a measuring device is based is to use the main transformer flux to produce an electro-motive force which can be considered proportional to the terminal voltage as a first approximation. According to the present invention therefore a special measuring winding which is not connected to the high-voltage potential is arranged inside the transformer, the diameter of this winding being so selected that its winding voltage when the transformer is loaded is equal to the average winding voltage of the main transformer winding which is to be measured.

Figure 1:
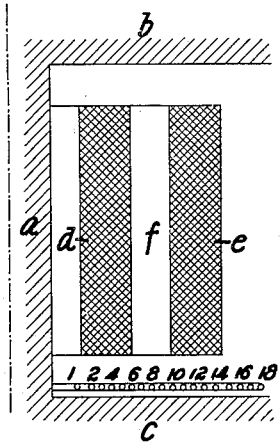
Figure 1A:
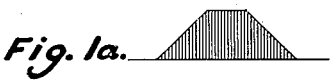
Figure 3:
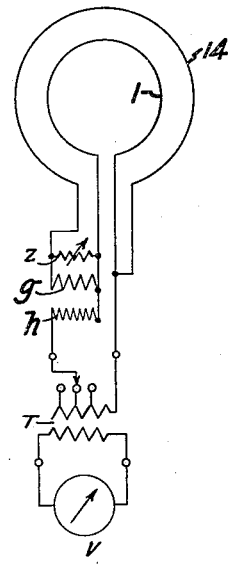
Figure 2:
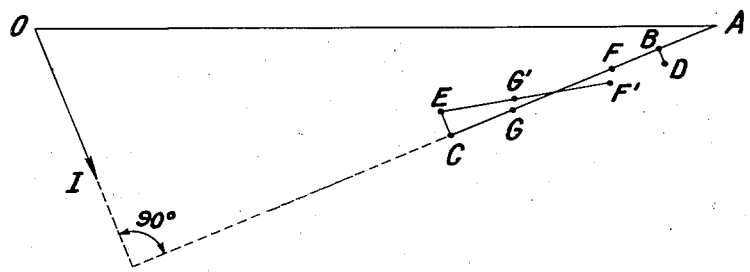
Figure 4:
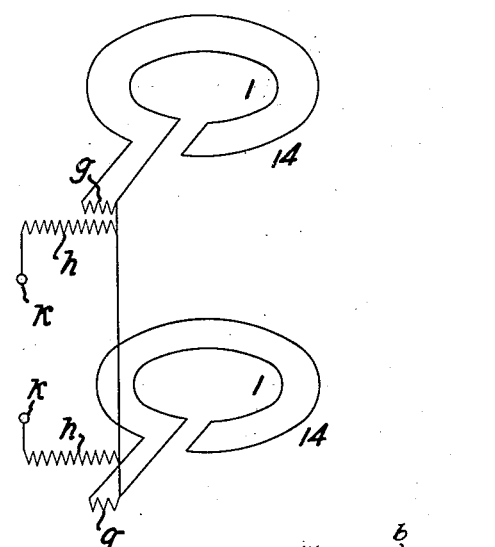
Figure 5:
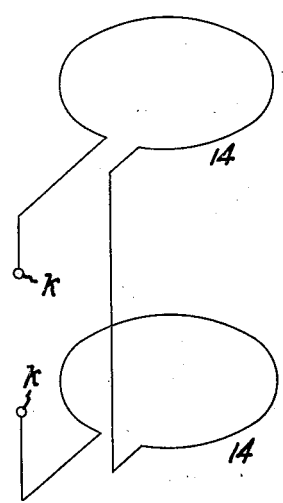
Figure 6:
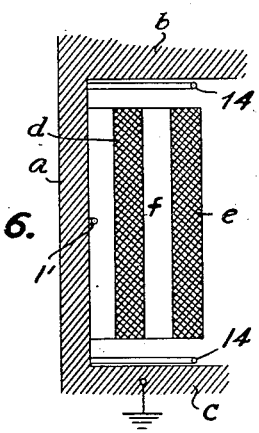

A constructional example of the invention is illustrated diagrammatically in the drawings in which Fig. 1 shows a longitudinal section through half the windings of a transformer, Fig. 1a is a curve sheet showing the distribution of the leakage field, in air, at the lower part of the transformer of Fig. 1, Fig. 2 shows the diagram of the winding voltage under load, Fig. 3 is a circuit diagram of a measuring system which includes a transformer for stepping up the induced voltage, Fig. 4 is a circuit diagram of a measuring or control system that includes secondary windings at symmetrically located positions between the iron yokes of the transformer, Fig. 5 is a circuit diagram of a more simple winding arrangement for comparing the leakage fields at different parts of the transformer, thereby to actuate a control or alarm circuit, and Fig. 6 is a longitudinal half section through another embodiment of the invention.

If according to the invention the measuring coil is linked at some point with the core of the transformer, then this coil serves as a very accurate measuring device for the voltage as long as the transformer is not loaded, because practically all magnetic lines of force then pass only through the iron. These conditions are, however, changed as soon as the transformer is placed under load because then there is a stray flux through the air so that the position of the measuring loop relative to the iron and also its diameter have considerable influence on the induced E. M. F.

The classical theory of the transformer assumes that the leakage field takes an axial course and permeates both windings as well as the channel between the windings themselves. In a conventional transformer, as shown in Fig. 1, the reference character $a$ identifies the core of the transformer to which both yokes $b$ and $c$ are joined. This core $a$ is surrounded by the cylindrical low-voltage winding $d$ which is enclosed by the high-voltage winding $e$ and spaced therefrom by a radial air gap $f$. The distribution of the leakage field in the lower part, and outside of the iron, of the transformer is shown in Fig. 1a.

In the vicinity of the yoke $c$ which is preferably grounded, there are a number of measuring loops designated by the numerals 1, 2, 3 ... 18. According to the invention that measuring loop or group of loops is selected which when the transformer is loaded is linked with a leakage flux of the same magnitude as the main winding the terminal voltage of which is to be measured.

The no-load or main flux of the transformer induces in all measuring windings the same voltage, whilst the leakage voltage which occurs when the transformer is under load induces in each of the 18 measuring loops 1–18 a different voltage. When under a load at which a particular voltage is established in one of the main transformer windings, for instance in the winding $e$, the voltage induced across each loop has a definite value that varies with the transformer loading. As a result of the leakage flux due to the loading, the E. M. F. in the winding 1 is for instance smaller and that in the winding 18 larger than the common voltage value established under no-load conditions. Thus between the windings 1 and 18 there is a winding with a definite diameter the leakage E. M. F. of which exactly equals the average voltage of the main winding induced by the leakage field. Such a measuring loop or winding gives an exact picture of the terminal voltage of the main winding in question, for example the high voltage winding $e$, both for no-load as well as for any loading of the power transformer.

If the measuring winding is loaded with several hundred volt-amperes the voltage of course decreases. Its inductive portion and also its ohmic portion on the primary side always remain very small because the measuring power in question is so small compared with the rated power for which the transformer is designed. The ohmic voltage drop on the secondary side is dependent on the measuring winding itself, so that by means of expedient dimensioning its influence can be kept within moderate limits.

The arrangement described above thus possesses all the properties of an ordinary voltage transformer. Its advantages are, however, very great. The insulation problem which presents great difficulties when transformers have to be constructed for high-voltages is solved by arranging the measuring windings as near as possible to the grounded iron or as far as possible away from the high-voltage winding. Furthermore the entire device is built into the power transformer itself and therefore requires no additional outlay for further effective material.

Under certain conditions it may be necessary to employ a modified form of the device described above. When it is assumed that there is a straight line field not only over the entire axial length of the winding but also over the length of the entire core (this being composed of the sum of the winding length and the end insulation distances), the correct diameter of the measuring winding lies obviously somewhere between the inner and outer diameter of the associated main or power winding, for instance in Fig. 1 between the loops 9 and 14. In practice, however, this simple assumption as regards the course of the magnetic field does not apply, especially in the immediate vicinity of the yoke, that is to say just in that region which is here under consideration. The lines of force bend outwards considerably so that the diameter of the measuring loop which gives a correct measurement of the voltage is considerably larger than would be the case according to the theory stated above. It can even be so large that the practical construction of such a measuring winding becomes impossible. In order therefore to reproduce the terminal voltage for instance of the outer winding $e$, according to the arrangement shown in Fig. 1 two measuring windings of different diameters, for example the loops 1 and 14, are arranged around the iron core, these being connected in opposition to each other.

Fig. 2 shows the vector diagram of the coil voltages when the transformer is loaded:

OA is the E. M. F. of a coil surrounding the iron core,
OB the average E. M. F. of a low-voltage coil,
OC the average E. M. F. of a high-voltage coil,
OF the E. M. F. of the inner measuring winding 1,
OG the E. M. F. of the outer measuring winding 14,
I the vector of the load current.

All electromotive forces which are induced by the leakage field lines are displaced by 90° with regard to the current I, so that the points A, B, C, F, G lie in a straight line, whilst the E. M. F. induced by the main flux generally has a different direction. Furthermore it is easy to see that the points F and G will lie between B and C because the leakage lines bend themselves outwards and there is a smaller concentration of lines in the region of the measuring coils than in the region where the actual windings are situated.

If now according to the arrangement shown in Fig. 3 the voltage FG is stepped up in a special supplementary transformer $g$, $h$ to the value FC and this supplementary voltage is connected in series with the E. M. F. of the inner measuring coil 1, the E. M. F. represented in Fig. 2 by the vector OC will be obtained at the terminals $oc$, that is to say the average E. M. F. per coil of the high-voltage winding $e$. This compensation is correct for all loads (according to magnitude and phase) and requires only a correct adjustment of the transformation ratio of the transformer. This latter only depends on the geometric arrangement of the transformer and can be determined most easily by means of a short-circuit test. The ohmic voltage drop in both windings is determined by the vectors BD and CE parallel to the current I and results in the average coil voltage for the winding $d$ being represented by OD instead of OB and for the winding $e$ by OE instead of OC. This influence can be taken into account by the measuring device without difficulty by connecting for instance a suitable impedance $z$ into the circuit of the supplementary transformer $gh$ (Fig. 3). This impedance causes the vector FG (Fig. 2) to rotate backwards into the position F'G' and simultaneously to become smaller; the supplementary transformer can then, if its transformation ratio is correctly adjusted, take the ohmic drop in the main windings exactly into account. This compensation is also independent of the load.

The voltmeter V may be coupled to the measuring circuit by a supplemental low voltage transformer T, see Fig. 3, when a definite value of say 100 or 110 volts is prescribed for the normal voltage in the measuring circuit. The number of turns of the several loops 1–18 cannot be selected as freely as is the case with the ordinary instrument transformer but the effective measuring voltage can be adjusted to any desired value by appropriate design of the transformer T. The supplemental transformer may be located within or outside of the main transformer casing. If the power winding is tapped for voltage adjustment, a winding of the supplemental transformer T is provided with a corresponding number of taps.

According to a further embodiment of the invention it is possible to protect each single-phase transformer or each core of a three-phase transformer separately against coil short-circuits. The device described above can thus be employed twice, namely at two symmetrically located points of a closed iron circuit and the voltages in both measuring systems compared with each other.

Two constructional examples of this arrangement are illustrated diagrammatically in Figs. 4 and 5. According to the embodiment shown in Fig. 4 both partial measuring windings 1 and 14, which together form a measuring system, are arranged twice on each limb of the transformer, one being in the vicinity of the upper yoke $b$ and the other in the vicinity of the lower yoke $c$. The voltages transformed in the transformers $gh$ are equal and in the same direction when the transformer is in order. A measuring instrument for the differential voltage or a protective relay actuated by the differential voltage is connected to the terminals $k$. As long as the transformer has no fault the differential voltage will be zero. If for any reason it is not exactly zero, although the transformer is in order, then the individual voltages must be mutually adjusted as already described; the magnitude being adjusted by altering the transformation ratio of one of the supplementary transformers $gh$, and the direction altered by connecting up to a suitable load. If a short-circuit occurs between the coils of the main transformer to be protected, a voltage difference will occur at the terminals $k$ which is either registered by the measuring instrument or actuates a protective relay.

The inner windings 1 of both measuring systems do not need to abut against the yokes b, c; they can be located at any convenient height on the core, care being taken, however, that they are arranged symmetrically. It is also possible to unite both inner measuring windings to form a single coil 1' which is located half way up the core, see Fig. 6.

It is even possible to omit entirely the coils 1 from the measuring system and to compare only the E. M. F. of the outer measuring windings 14, as illustrated diagrammatically in Fig. 5. With such an arrangement no adjustment can be made and the system is limited to an entirely symmetrical arrangement of the transformer windings.

The measuring systems 1, 14 can also be arranged on separate similarly wound cores of an iron circuit, but must then be located at symmetrical points of the core. For instance the outer windings 14 are arranged in a two-limbed transformer at the lower yoke end of one core and at the upper yoke end of the other core, whilst the middle windings 1 can be displaced symmetrically beyond the middle of the core up to the opposite yoke. This new arrangement is intended specially for single-phase transformers but can also be used for polyphase, for instance three-phase, transformers.

I claim:

1. In apparatus for measuring the voltage of a winding of a power transformer comprising primary and secondary windings on the core of a magnetic structure; a measuring winding for delivering a current to a voltage measuring instrument, said measuring winding comprising two coaxial partial windings of different diameters on said core, said partial windings having one pair of adjacent ends connected to each other, an auxiliary transformer having a primary winding connected between the other pair of ends of the partial windings, the secondary winding of the auxiliary transformer having one end connected to an end of its primary winding, and circuit elements connected between the other end of the secondary winding of the auxiliary transformer and the connected ends of said partial windings for establishing a current through said measuring instrument.

2. In apparatus for measuring the voltage of a winding of a power transformer, the invention as recited in claim 1, in combination with an adjustable impedance across a winding of said auxiliary transformer to adjust the phase relation of the differential voltages developed by said partial windings.

3. In apparatus for measuring the voltage of a winding of a power transformer, the invention as recited in claim 1, wherein said circuit elements include an instrument transformer having a tapped winding.

PAUL WALDVOGEL.